United States Patent

Nagai et al.

[11] Patent Number: 6,110,070
[45] Date of Patent: *Aug. 29, 2000

[54] LUBRICATING STRUCTURE OF TRANSMISSION

[75] Inventors: Masayuki Nagai, Fuji; Haruhito Mori, Kawasaki; Masaki Nakano, Yokohama, all of Japan

[73] Assignees: Jatco Corporation, Fuji; Nissan Motor Co., Ltd., Yokohama, both of Japan

[*] Notice: This patent issued on a continued prosecution application filed under 37 CFR 1.53(d), and is subject to the twenty year patent term provisions of 35 U.S.C. 154(a)(2).

[21] Appl. No.: 09/078,326

[22] Filed: May 14, 1998

[30] Foreign Application Priority Data

May 16, 1997 [JP] Japan ..................... 9-127439

[51] Int. Cl.[7] .................................. F16H 57/04
[52] U.S. Cl. ................. 476/8; 476/40; 476/42; 74/606 R; 184/6.12
[58] Field of Search .................. 476/8, 40, 42; 74/467, 606 R; 184/6.12, 11.1, 106

[56] References Cited

U.S. PATENT DOCUMENTS

| | | | |
|---|---|---|---|
| 4,583,423 | 4/1986 | Hahne | 475/136 |
| 5,230,258 | 7/1993 | Nakano | 476/42 |
| 5,309,789 | 5/1994 | Kameda et al. | 74/606 R |
| 5,456,129 | 10/1995 | Tane et al. | |
| 5,820,510 | 11/1998 | Ueda et al. | 476/40 |

FOREIGN PATENT DOCUMENTS

| | | |
|---|---|---|
| 69 111 80 | 3/1969 | Germany. |
| 3-92655 | 4/1991 | Japan. |
| 7-293653 | 7/1995 | Japan. |
| 2 173 872 | 10/1986 | United Kingdom. |
| 2 248 092 | 3/1992 | United Kingdom. |

*Primary Examiner*—David A. Bucci
*Assistant Examiner*—William C Joyce
*Attorney, Agent, or Firm*—Foley & Lardner

[57] ABSTRACT

A lubricating structure comprises an output gear 22 rotating as a unit with an output shaft 3 of a transmission mechanism, a gear 25 rotating as a unit with a counter shaft 27 and engaged with the gear 22, a gear 60 rotating as a unit with the shaft 27 and disposed spaced from the gear 25 in an axial direction, a bearing 26 and bearing 28b for rotatably supporting the shaft 27 respectively at a gear 25 side and a gear 60 side, a driving gear 65 disposed above the gear 60 and engaged with the gear 60 through an intermediate gear, a case 1a for individually accommodating through a separating wall the bearing 28b, a bearing at an intermediate gear side, and a bearing 67 at a gear 65 side, and feed paths 62,64 formed within the shaft 27 for introducing oil moved into an accommodating portion 70 of the gear 28b in the case 1a to a gear 25 side thereby to supply the oil to a predetermined portion. Furthermore, a void groove 76 is formed in the separating wall 69 between the accommodating portion 70 and an accommodating portion at an intermediate gear side.

2 Claims, 5 Drawing Sheets

LUBRICATING STRUCTURE OF TRANSMISSION

BACKGROUND OF THE INVENTION

1. Field of the Invention

The present invention relates to a lubricating structure of a transmission, and in particular, to a lubricating structure suitable for a toroidal type infinitely variable automatic transmission.

2. Description of the Related Art

A lubricating structure of a transmission of this type known in the art is described, for example in Japanese Patent Laid Open Publication Hei No.3-92655. This lubricating structure is applied to a toroidal type infinitely variable automatic transmission, and as shown in FIG. 5, this lubricating structure comprises an output gear c provided coaxially with a rotary shaft b of the toroidal transmission mechanism a and rotating as a unit with an output shaft q which transmits power of an output disks r, a first counter gear e rotating as a unit with a counter shaft d disposed in parallel with the rotary shaft b and engaged with the output gear c, a second counter gear f disposed spaced from the first counter gear e in an axial direction and rotating as a unit with the counter shaft d, a bearing g for rotatably supporting the counter shaft d at a first counter gear e side, a bearing h for rotatably supporting the counter shaft d at a second counter gear f side spaced from the first counter gear e, a driving gear i disposed above the second counter gear f and engaged with the second counter gear f through an intermediate gear (not shown), and a case n for individually accommodating through a separating wall m the bearing g, a bearing (not shown) for rotatably supporting a rotary shaft of the intermediate gear and a bearing k for rotatably supporting a rotary shaft j of the driving gear i, and a feed path o formed in an inside of the counter shaft d along an axis line and for supplying an oil introduced from an end portion at a second counter gear f side of the counter shaft d to each portion by leading to a first counter gear e side.

The feed path o is supplied with the oil by forced lubrication by an oil pump (not shown) from the end portion at the second counter gear f side of the counter shaft d through an oil path p formed in the case n.

However, in such a lubricating structure of the transmission, the forming of the oil path p through the case n is troublesome, and furthermore, there is a drawback in that because the oil pump is not driven while the vehicle is towed by another vehicle, it is impossible to feed oil to the feed path o, and thus to various portions.

Accordingly, in order to resolve such a drawback, a so-called raking or scraping lubricating system has been proposed in which the oil accumulated in a portion of the second counter gear f is raked or scraped by the rotation of the second counter gear f (which is rotated even under tow by another vehicle) to move the oil into a portion of the case n accommodating the bearing h, and then this oil which has moved into the accommodating portion is introduced into the feed path o from an opening at the end portion at the second counter gear f side of the counter shaft d.

Here, in the proposed raking lubricating system, it is desired to increase the amount of oil introduced into the feed path o and to supply sufficent oil to various portions. In particular, in the toroidal transmission mechanism as shown in FIG. 5, because the output gear c, the first counter gear e and the bearing g are disposed in a narrow space between the pair of output disks r having their rear portions opposing to each other, it is difficult to supply sufficient oil to these portions. Thus, it is desired to increase the amount of oil introduced into the feed path o in order to supply sufficent oil to the output gear c, the first counter gear e and the bearing g, etc.

SUMMARY OF THE INVENTION

The present invention was made in response to the needs mentioned above, and it is an object to provide a lubricating structure of a transmission capable of increasing the amount of oil introduced into the feed path within the counter shaft thereby to supply sufficient oil to various portions.

In order to achieve such an object, in a first aspect of the invention, a lubricating structure of a transmission comprising an output gear rotating as a unit with an output shaft of a transmission mechanism, a first counter gear rotating as a unit with a counter shaft disposed in parallel with the output shaft and engaged with the output gear, a second counter gear rotating as a unit with the counter shaft and disposed spaced from the first counter gear in an axial direction, a first bearing for rotatably supporting the counter shaft at a first counter gear side, a second bearing for rotatably supporting the counter shaft at a second counter gear side spaced from the first counter gear side, a driving gear disposed above the second counter gear and engaged with the second counter gear through an intermediate gear, a case for individually accommodating through a separating wall the second bearing, a third bearing rotatably supporting the intermediate gear, and a fourth gear rotatably supporting the driving gear, the case being provided with an accommodating portion for accommodating the second bearing and an accommodating portion for accommodating the third bearing disposed above the accommodating portion of the second bearing, the accommodating portion of the second bearing and the accommodating portion of the third bearing being partitioned by the separating wall to be independent of each other, and a feed path formed within the counter shaft for supplying oil moved into an accommodating portion of the second gear in the case to the first counter gear, wherein, a void portion is formed in the separating wall for partitioning the accommodating portion of the second gear in the case and the accommodating portion of the third bearing, and the oil in the accommodating portion of the third bearing is introduced into the accommodating portion of the second bearing through the void portion.

In a second aspect of the invention, in the first aspect, the transmission mechanism has a pair of output disks coupled to the output shaft, the output disks have rear portions, and the rear portions are opposed to each other and are positioned to put the output gear driven by the output shaft, the first counter gear, and the first bearing between the rear portions.

DESCRIPTION OF THE PREFERRED EMBODIMENTS

Figure 1:
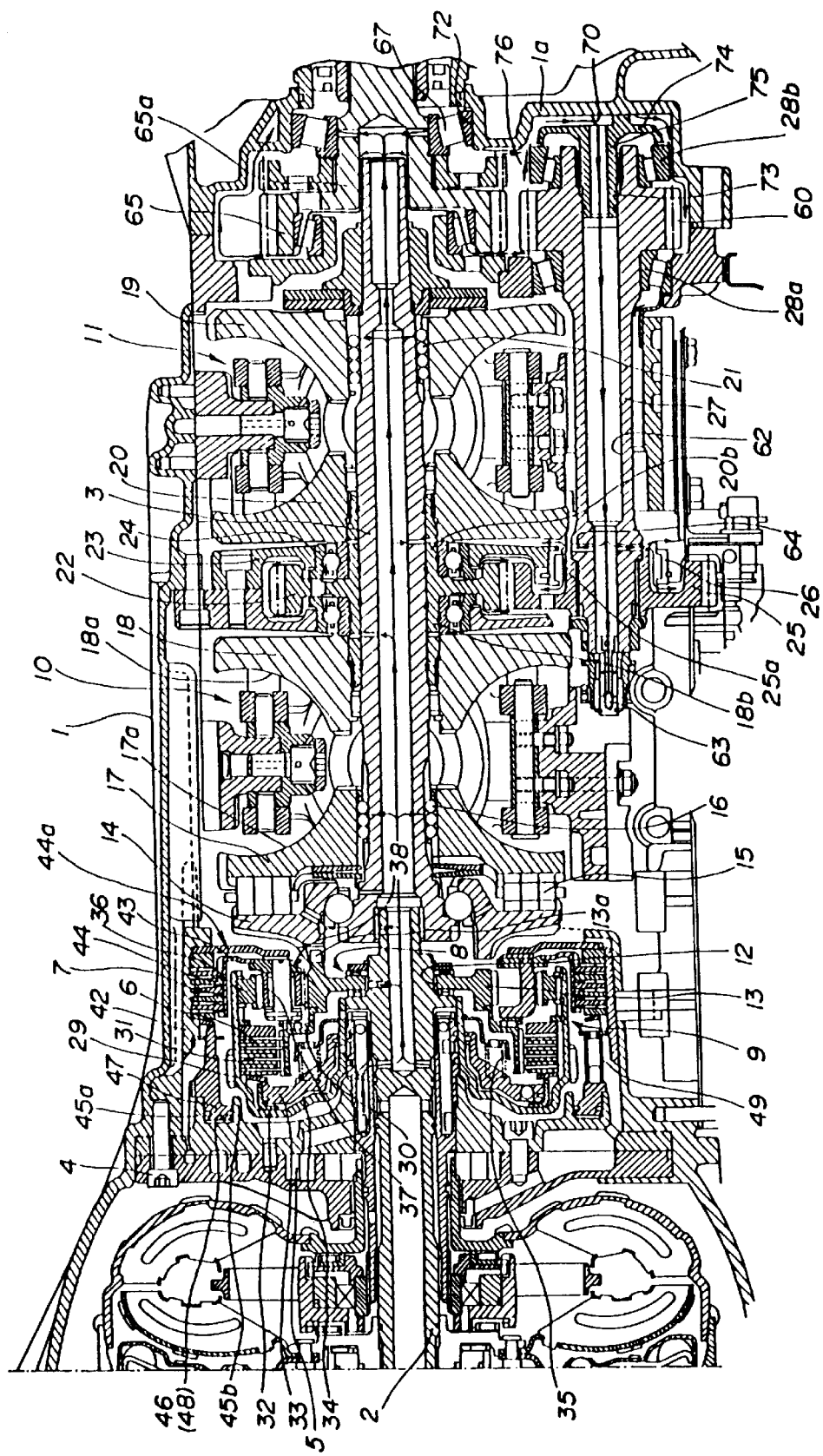
FIG. 1 is a sectional view for explaining a lubricating structure of a toroidal type infinitely variable automatic transmission which is an example of an embodiment of the present invention.
Figure 2:
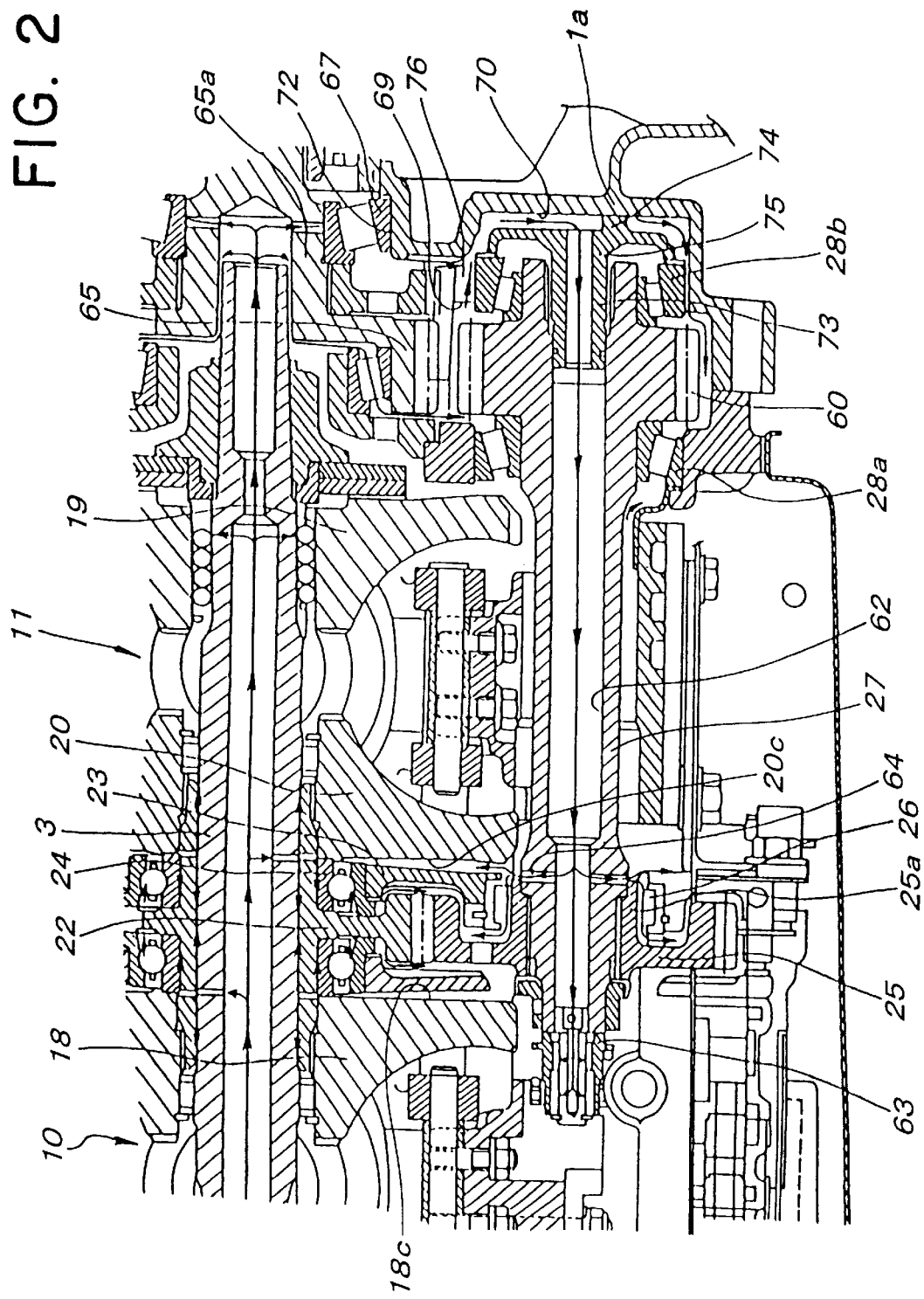
FIG. 2 is an enlarged diagram of a part of FIG. 1.

As shown in FIGS. 1 and 2, an input shaft 2 connected to a rotary driving source (not shown), and a rotary shaft 3 arranged concentrically with the input shaft 2 at a right side thereof are disposed within a transmission case 1, and at a input shaft 2 side, there are provided with an oil pump 5 mounted on an end portion of the transmission case 1 with a bolt 4, and a forward and backward change-over mechanism 9 disposed adjacent to the oil pump 5 at a right side thereof. The forward and backward change-over mechanism 9 performs change-over between a forward operation and a backward operation of a first and a second toroidal transmission mechanism 10,11 through a planetary gear mechanism 8 by manipulation of a forward clutch 6 and a backward brake 7. Furthermore, at an output shaft 3 side, there are provided with the first and the second toroidal transmission mechanism 10, 11 spaced from each other in the axial direction.

Between the input shaft 2 and the rotary shaft 3, there are interposed with a sun gear 13 rotatably supported by the input shaft 2 through a needle bearing 12 and constituting an element or the planetary gear mechanism 8 of the forward and backward change-over mechanism 9, a loading cam 14 engaged with a claw portion 13a formed on the sun gear 13 and rotatably supported by the rotary shaft 3, and an input disk 17 connected to the loading cam 14 through an engaging roller 1b and supported by the rotary shaft 3 through a ball spline 16. The rotational force from the input shaft 2 is sequentially transmitted to the claw portion 13a of the sun gear 13 through the forward and backward change-over mechanism 9 and to the loading cam 14, and eventually to the rotary shaft 3 through the engaging roller 15, the input disk 17, and the ball spline 16.

Wave-shaped cam surfaces are respectively formed on mutually opposing surfaces of the loading cam 14 and the input disk 17 to allow the engaging roller 15 to engage both of them. By applying thrust proportional to a torque due to a lead on the cam surfaces by the engaging roller 15, it is made possible to adjust the thrust (moving force) proportional to output of a torque converter exerted to the input shaft 2 side by the rotary shaft 3, that is, the first and the second toroidal transmission mechanism 10, 11.

For the sake of convenience of explanation, first, the first and the second toroidal transmission mechanism 10, 11 will be explained. The first toroidal transmission mechanism 10 includes the input disk 17 having a toroidal surface 17a formed on a surface remote from the engaging roller 15, an output disk 18 having a toroidal surface 18a formed on a surface opposing to the input disk 17 and rotatably supported by the rotary shaft 3, and a friction roller (not shown) disposed in a toroidal-shaped groove defined by the toroidal surfaces 17a and 18a of the input and output disks 17 and 18 so that the friction roller is tiltably in contact with both the disks. The friction roller is tiltably supported by a roller supporting mechanism (not shown), and the rotational speed ratio between the input disk 17 and the output disk 18, that is, the transmission gear ratio can be continuously varied by changing radial contact positions of the friction roller with respect to the input and output disks 17 and 18 by manipulating a driving mechanism (not shown).

The second toroidal transmission mechanism 11, similar to the first toroidal transmission mechanism 10, includes an input disk 19, an output disk 20, a friction roller, a roller supporting mechanism, and a driving mechanism, however, the input disk 19 which is outer fitted onto the rotary shaft 3 through a ball spline 21 is disposed at a position remote from the first toroidal transmission mechanism 10, and at the same time, the output disk 20 is disposed at a near side of the first toroidal transmission mechanism 10.

At the rear portions 18c and 20c of the output disks 18 and 20 opposing to each other, there are provided with cylindrical shaft portions 18b and 20b forming an output shaft of the first and second toroidal transmission mechanisms 10 and 11, and an output gear 22 is spline coupled with the cylindrical shaft portions 18b and 20b. The output gear 22 is supported through bearings 24 by a gear housing 23 secured to an inner peripheral wall of the transmission case 1. The output gear 22 is engaged with a first counter gear 25, and a counter shaft 27 is spline coupled at one end thereof with a center portion of the first counter gear 25 so that the counter shaft 27 is rotated as a unit with the first counter gear 25. A boss portion 25a of the first counter gear 25 is rotatably supported by a cylindrical roller bearing (first bearing) 26, and by this, an end portion at a first counter gear 25 side of the counter shaft 27 is rotatably supported by the cylindrical roller bearing 26 through the boss portion 25a.

A second counter gear 60 which is rotated as a unit with the counter shaft 27 is provided at a position spaced from the first counter gear 25 towards right in an axial direction, and an end portion of the counter shaft 27 at a second counter gear 60 side is rotatably supported by a pair of tapered roller bearings 28a and 28b which are disposed at axial opposite end sides of the second counter gear 60. One tapered roller bearing 28a of the pair of tapered roller bearings 28a and 28b, which is disposed at a first counter gear 25 side of the second counter gear 60 is mounted on the transmission case 1, and the other tapered roller bearing 28b which as disposed at a side of the counter gear 60 spaced from the first counter gear 25 is mounted on a rear case 1a attached to a rear end portion of the transmission case 1.

A main oil path 62 is formed in the inside of the counter shaft 27 penetrating from an end face of the counter shaft 27 at a first counter gear 25 side to an end face at a second counter gear 60 side, and one-way clutch 63 is mounted on an end opening of the counter shaft 27 at a first counter gear 25 side. A plurality of subfeed paths 64 are formed in an outer peripheral surface of the counter shaft 27 at predetermined intervals in a circumferential direction at a position adjacent to a right-end portion of the cylindrical roller bearing 26 between the pair of output disks 18 and 20. The subfeed paths 64 extend radially to communicate with the main feed path 62.

The second counter gear 60 is engaged with a driving gear 65 disposed above the second counter gear 60 through an intermediate gear 66. A boss portion (rotary shaft) 65a of the driving gear 65 and a boss portion (rotary shaft) not shown of the intermediate gear 66 (see FIG. 3) protrude towards a side spaced from the first counter gear 25, and the boss portion of the intermediate gear 66 is rotatably supported by a tapered roller bearing (third bearing) 66a mounted on the rear case 1a, and the boss portion 65a of the driving gear 65 as rotatably supported by a tapered roller bearing (fourth bearing) 67 mounted on the rear case 1a.

The output adjusted to a predetermined transmission ratio by a tilting manipulation of the friction roller mentioned above, is combined at the output gear 22, and transmitted to an output shaft (not shown) sequentially through the first counter gear 25, counter shaft 27, second counter gear 60, intermediate gear 66 and driving gear 65.

Figure 3:
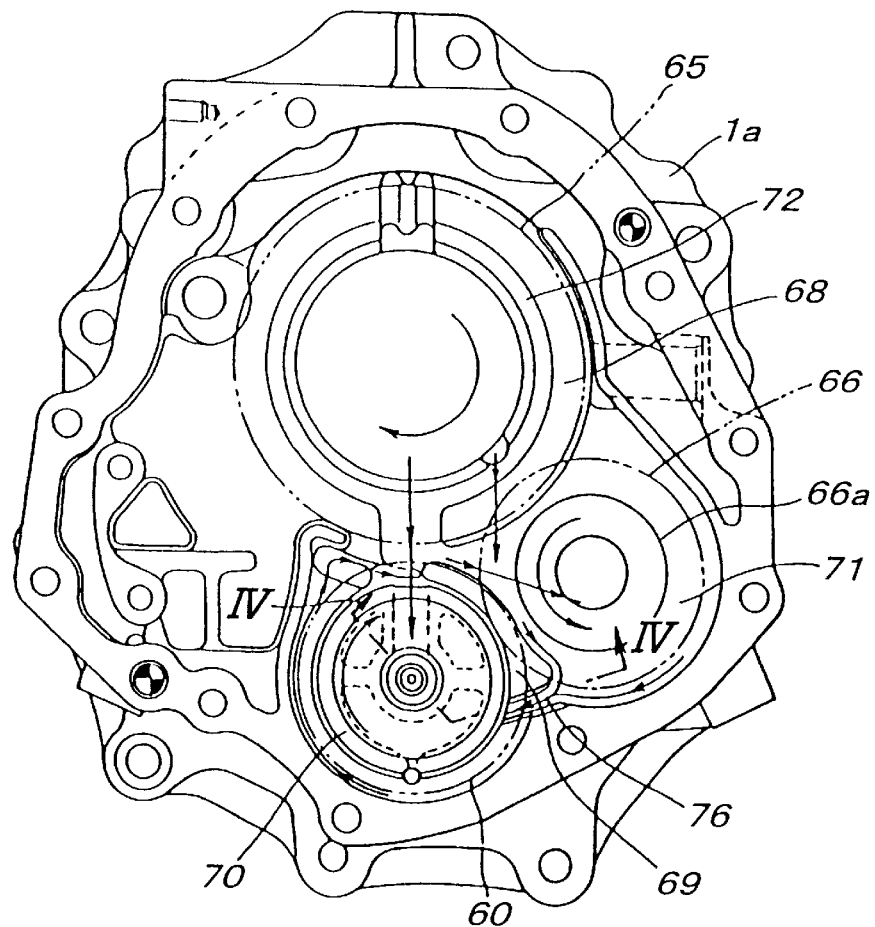
FIG. 3 is a plan view for explaining an inside structure of a case.
Figure 4:
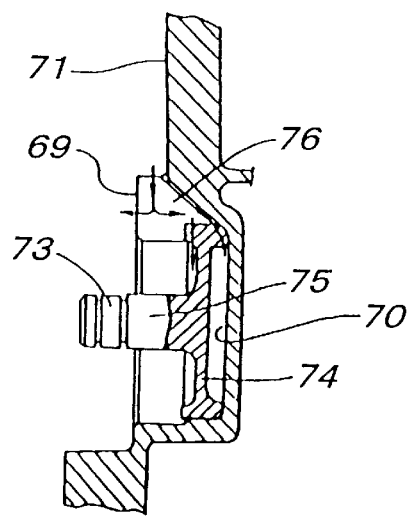
FIG. 4 is a sectional view taken along the line IV—IV in FIG. 3.
Figure 5:
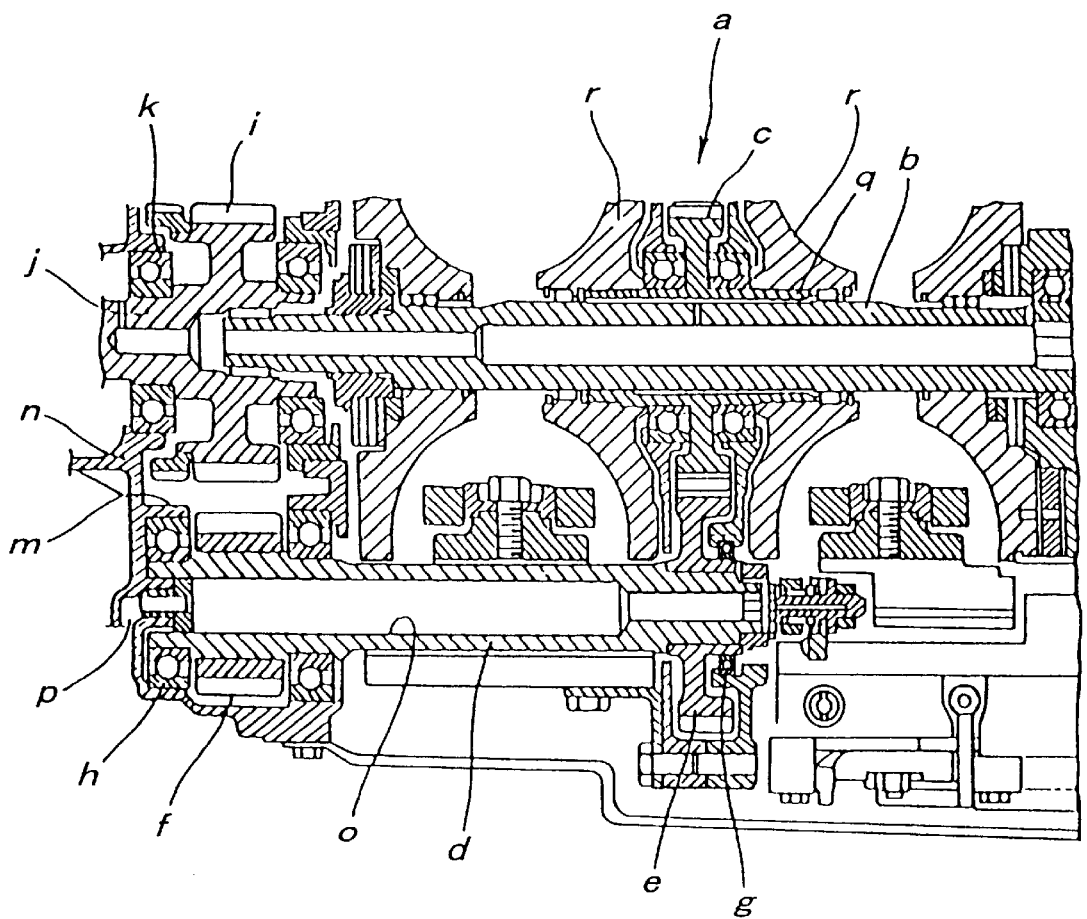
FIG. 5 is a sectional view for explaining a lubricating structure of a prior art transmission.
Figure 6:
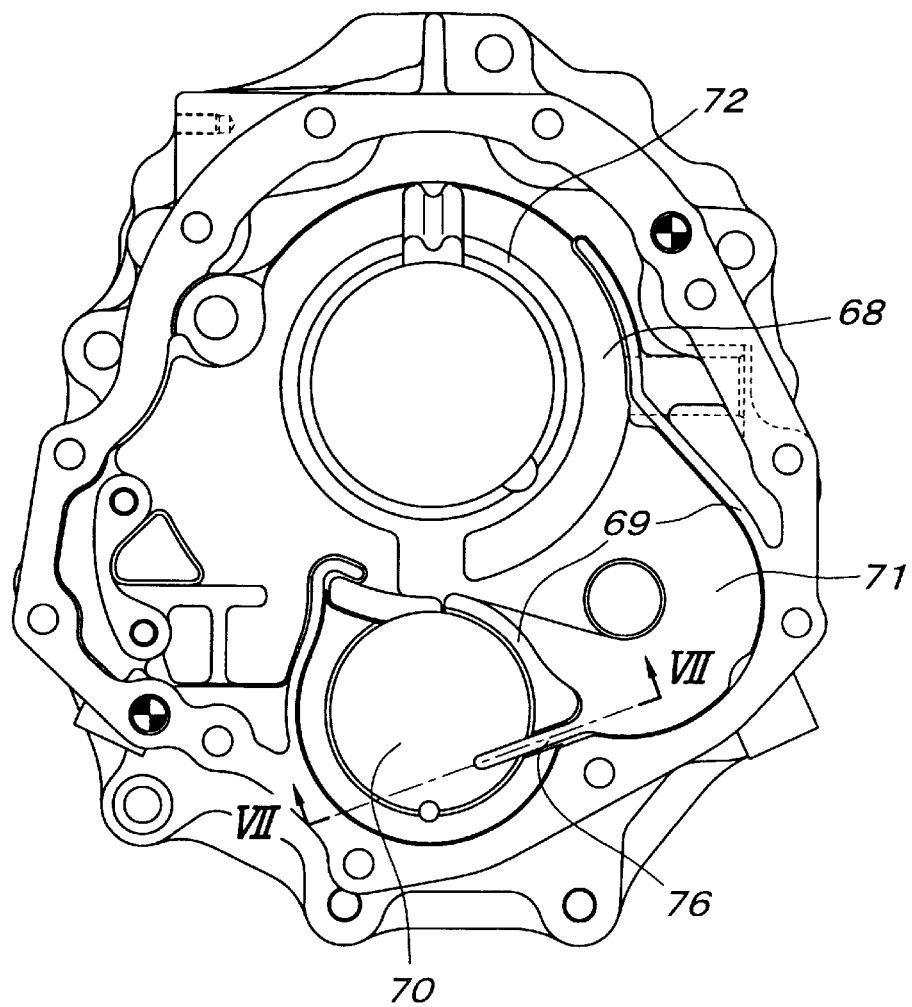
FIG. 6 is a plan view of the case shown in FIG. 3.
Figure 7:
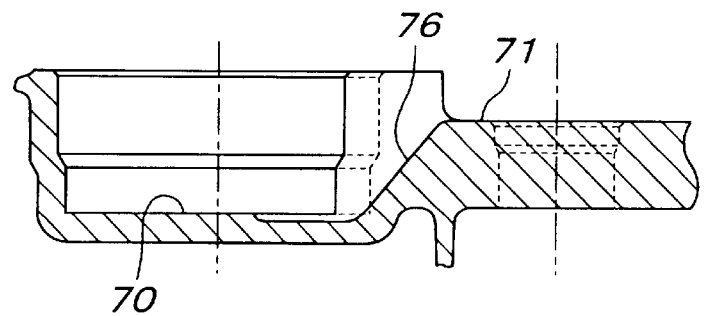
FIG. 7 is a sectional view taken along the line VII—VII in FIG. 6.

Here, the rear case 1a, in order to individually accommodate the tapered roller bearing 28b of the second counter gear 60 at a side spaced from the first counter gear 25, the tapered roller bearing 66a at an intermediate gear 66 side, and the tapered roller bearing 67 at a driving gear 65 side, as shown in FIGS. 3 and 6, is partitioned by separating walls 68 and 69 into an accommodating portion 70 of the tapered roller bearing 28b at a second counter gear 60 side, an accommodating portion 71 of a tapered roller bearing 66a at a intermediate gear 66 side, and an accommodating portion 72 of the tapered roller bearing 67. An oil garter 75 having a flange portion 74 provided at an end portion of the cylindrical portion 73 is disposed between a bottom portion of the accommodating portion 70 and the tapered roller bearing 28b accommodated in the accommodating portion 70 in a condition where the flange portion 74 is inserted into the accommodating portion 70, and the cylindrical portion 73 of the oil garter 75 is inserted into the main feed path 62 from an end opening of the counter shaft 27.

As shown in FIGS. 3, 4, 6 and 7, a void groove 76 is formed in the separating wall 69 between the accommodating portion 70 of the tapered roller bearing 28b at a second counter gear 60 side and the accommodating portion 71 of the tapered roller bearing 66a at the intermediate gear 66 side, and the void groove 76 extends obliquely downwardly from the accommodating portion 71 to introduce the accumulated oil into the accommodating portion 70.

During driving of the vehicle where the oil pump 5 is being driven, or under tow by another vehicle where the oil pump 5 is not driven, the oil which drops from a driving gear 65 side and accumulated in a second counter gear 60 portion is raked by the rotation of the second counter gear 60 and introduced into the bottom portion of the accommodating portion 70 passing the tapered roller bearing 28b. The oil introduced into the bottom portion of the accommodating portion 70 is further introduced into the main feed path 62 while being guided by the flange portion 74 of the oil garter 75 and by the cylindrical portion 73, and at the same time, the oil dropped from the driving gear 65 side and accumulated in the accommodating portion 71 of the tapered roller bearing 66a at the intermediate gear side flows into the bottom portion of the accommodating portion 70 passing through the void groove 76, and the oil flowed into this bottom portion is introduced into the main feed path 62 while being guided by the flange portion 74 of the oil garter 75 and the cylindrical portion 73.

The oil introduced into the main feed path 62 flows to a counter gear 25 side through the main feed path 62, and it is supplied to the one-way clutch 63 mounted on the end opening at the first counter gear 25 side, and at the same time, the oil flows into a side portion of the cylindrical roller bearing 26 passing through the subfeed paths 64, and supplied to the cylindrical roller bearing 26 and to an engagement portion between the output gear 22 and the first counter gear 25. In this respect, the oil which has not been introduced into the main feed path 62 from the bottom portion of the accommodating portion 70 is accumulated again in the second counter gear 60 portion, and similar raking lubrication is carried out.

Next, with reference to FIG. 1, a forward and backward change-over mechanism 9 will be described. The forward and backward change-over mechanism 9 is used to change over between the first and second toroidal transmission mechanisms 10 and 11, that is, to change over between the forward operation and the backward operation, and it is constituted by a forward clutch 6, a backward brake 7 and a planetary gear mechanism 8.

The forward clutch 6 is positioned between the oil pump 5 and the sun gear 13, and is provided with a clutch drum 29 which is outer fitted onto the input shaft 2. The clutch drum 29 rotates with the input shaft 2 as a unit, and a clutch hub 30 supported by the sun gear 13 of the planetary gear mechanism 8 is disposed at a radially inner position of the clutch drum 29. The clutch drum 29 and the clutch hub 30 support clutch disks 31 arranged alternately.

A cylinder chamber 32 is formed within a base end portion (end portion at the oil pump 5 side) of the clutch drum 29, and a piston 33 is accommodated in the cylinder chamber 32. A hydraulic pressure chamber 34 is formed between the piston 33 and the cylinder chamber 32, and the clutch disks 31 are pressed or the pressing is released by controlling the supply of hydraulic oil to the hydraulic pressure chamber 34, thereby to perform the engagement or disengagement of the forward clutch 6. In the figure, the reference numeral 35 designates a return spring for returning the piston 33 to its original position when the pressing of the clutch disks 31 is released.

Furthermore, a ring gear 36 is mounted on an inner peripheral portion of an end of the clutch drum 29, and the ring gear 36 is engaged with the sun gear 13 through a pinion 37.

The backward brake 7 includes a drum 42 disposed at a radially outer position of the clutch drum 29. The drum 42 is constituted by an extension member having a drum shape and extending from a right side portion of the oil pump 5 towards the first toroidal transmission mechanism 10, and the drum 42 is integral with the oil pump 5. A brake hub 43 is disposed between the drum 42 and the clutch drum 29 of the forward clutch 6, and the brake hub 43 is supported by the carrier plate 38 at a first toroidal transmission mechanism 10 side. The drum 42 and the brake hub 43 support brake disks 44 alternately arranged.

In FIG. 1, the reference numeral 44a designates a supporting wall mounted on an inner peripheral wall of a toroidal transmission side through a snap spring or the like near a right end of the backward brake 7 of the drum 42. This supporting wall 44a as disposed to oppose the carrier plate 38 to receive the thrust force from the carrier generated in a forward and backward change-over mechanism 9 side. By virtue of this, the thrust force is prevented from being transmitted to a first and second toroidal transmission 10, 11 side.

Two peripheral wall portions 45a and 45b extending along a whole circumference in a circumferential direction are formed radially spaced from each other at a right side of the oil pump 5 at positions radially inward of the drum 42, and a cylinder chamber 46 is formed between the peripheral wall portions 45a and 45b. A piston 47 is accommodated in the cylinder chamber 46, and a hydraulic pressure chamber 48 is formed between the piston 47 and the cylinder chamber 46. The brake disks 44 are pressed or released from the pressing by controlling the supply of hydraulic oil to the hydraulic pressure chamber 48 thereby to perform the engagement and disengagement of the backward brake 7. In FIG. 1, the reference numeral 49 designates a return spring for returning the piston 47 to its original position when the pressing of the brake disks 44 is released.

At the time of forward operation, the forward clutch 6 is pressed by the piston 33 to make the forward clutch 6 enter an engagement condition, and the backward brake 7 is released from the pressing by the piston 47 to make the backward brake 7 enter a disengagement condition. Under such a condition, the input shaft 2, the clutch drum 29, the ring gear 36, the carrier 38, and the sun gear 13 are rotated in the same direction as a unit. Consequently, the rotational force is transmitted to the first toroidal transmission mechanism 10 through the loading cam 14 which is engaged with the claw portion 13*a* of the sun gear 13.

On the other hand, at the time of backward operation, the clutch disks 31 of the forward clutch 6 are released from the pressing by the piston 33 to make the forward clutch 6 enter a disengagement condition, and the brake disks 44 of the backward brake 7 are pressed by the piston 47 to make the backward brake 7 enter the engagement condition. Consequently, the revolution of the pinion 37 is interrupted through the brake hub 43 and the carrier 38. Under such a condition, the rotational force from the input shaft 2 and the clutch drum 29 which are integral with each other is transmitted from the ring gear 36 to the sun gear 13 through the pinion 37, however, since the revolution of the pinion 37 is interrupted as described above, the sun gear 13 is rotated in an opposite direction with respect to the input shaft 2, and the rotational force is transmitted to the first toroidal transmission mechanism 10 through the loading cam 14 which is engaged with the claw portion 13*a* of the sun gear 13.

As will be seen from the above description, in the lublicating structure of the toroidal type infinitely variable automatic transmission of such an arrangement, even during the traction of the vehicle in which the oil pump 5 is not driven, the oil raked by the second counter gear 60 is introduced into the main feed path 62 from the bottom portion or the accommodating portion 70 of the rear case 1*a* through the oil garter 75, and at the same time, also the oil accumulated in the accommodating portion 71 at the intermediate gear 66 side flows into the bottom portion of the accommodating portion 70 passing through the void groove 76 and then the oil is introduced into the main feed path 62 through the oil garter 75. Accordingly, as compared with the prior art, it is possible to increase the amount of oil introduced into the main feed path 62 by the amount which flows into the accommodating portion 70 from the accommodating portion 71, and as a result, sufficient oil can be supplied to the one-way clutch 63 disposed at the first counter gear 25 side, the cylindrical roller bearing 26, the engaging portion between the output gear 22 and the first counter gear 25, etc. In particular, it is possible to achieve the lubricating structure suitable for the toroidal type infinitely variable transmission in which the output gear 22, the first counter gear 25, and the cylindrical roller bearing 26 are disposed in a narrow space between the pair of output disks 18 and 20 where the supply of the oil is very difficult.

The present invention offers the following advantages.

In the first aspect of the invention, even during the traction of the vehicle where the oil pump is not driven, the oil raked by the second counter gear is introduced into the feed path from the accommodating portion of the second bearing in the case, and at the same time, the oil accumulated in the accommodating portion or the third bearing at the intermediate gear side flows into the accommodating portion of the second bearing passing through the void portion and then the oil is introduced into the feed path within the counter shaft from the accommodating portion. As a result, as compared with the prior art, it is possible to increase the oil introduced into the feed path by the amount which flows into the accommodating portion of the second bearing from the accommodating portion of the third bearing, and an advantage is offered in that sufficient oil can be supplied to various members at the first counter gear side.

According to the second aspect of the invention, in addition to the first aspect, an advantage is provided in that the lubricating structure is suitable for the toroidal infinitely variable automatic transmission in which the output gear, the first counter gear, and the first bearing are disposed at a narrow space between the pair of output disks, which makes it otherwise difficult to supply the oil.

We claim:

1. A continuously variable transmission comprising:

an input disk and an output disk;

an output gear rotating as a unit with an output shaft;

a first counter gear rotating as a unit with a counter shaft disposed in parallel with the output shaft, and engaged with the output gear;

a second counter gear rotating as a unit with the counter shaft and disposed spaced from the first counter gear in an axial direction;

a first bearing for rotatably supporting the counter shaft at a first counter gear side;

a second bearing for rotatably supporting the counter shaft at a second counter gear side spaced from the first counter gear;

a driving gear disposed above the second counter gear and engaged with the second counter gear through an intermediate gear;

a case for individually accommodating through a separating wall the second bearing, a third bearing rotatably supporting the intermediate gear, and a fourth bearing rotatably supporting the driving gear, the case being provided with an accommodating portion for accommodating the second bearing and an accommodating portion for accommodating the third bearing disposed above the accommodating portion of the second bearing, the accommodating portion of the second bearing and the accommodating portion of the third bearing being partitioned by the separating wall to be independent of each other; and a feed path formed within the counter shaft for supplying oil moved into an accommodating portion of the second gear in the case to the first counter gear, wherein, a void portion is formed in the separating wall for partitioning the accommodating portion of the second bearing in the case and the accommodating portion of the third bearing, and the oil in the accommodating portion of the third bearing is introduced into the accommodating portion of the second bearing through the void portion.

2. A continuously variable transmission according to claim 1, wherein said transmission has a pair of output disks coupled to the output shaft, the output disks have rear portions, and the rear portions are opposed to each other and are positioned to put the output gear driven by the output shaft, the first counter gear and the first bearing between the rear portions.

* * * * *